United States Patent [19]

Corcoran

[11] 4,413,665
[45] Nov. 8, 1983

[54] DEVICE FOR PREVENTING OVERWINDING OF A ROLLER BLIND

[76] Inventor: Sean Corcoran, 34, Clarinda Park West, Dun Laoghaire, County Dublin, Ireland

[21] Appl. No.: 209,211

[22] Filed: Nov. 21, 1980

[30] Foreign Application Priority Data

Dec. 7, 1979 [IE] Ireland .................. 2370/79

[51] Int. Cl.³ .......................... A47G 5/02; A47H 1/00
[52] U.S. Cl. ................................................. 160/315
[58] Field of Search ............... 160/298, 299, 315, 318, 160/323-326; 248/254, 267, 330.1, 334.1; 185/13, 43; 64/28 R, 30 C

[56] References Cited

U.S. PATENT DOCUMENTS

| | | | |
|---|---|---|---|
| 189,660 | 4/1877 | Shaw | 160/299 |
| 1,341,530 | 5/1920 | Wise | 160/315 |
| 1,468,322 | 9/1923 | Odom | 185/43 |
| 1,766,746 | 6/1930 | Heckman | 160/315 |
| 1,851,332 | 3/1932 | Schwarz, Jr. | 248/267 |
| 2,110,048 | 3/1938 | May | 160/315 |
| 2,632,993 | 3/1953 | Hill et al. | |
| 4,228,843 | 10/1980 | Kobayashi | 160/315 |

FOREIGN PATENT DOCUMENTS

| | | | |
|---|---|---|---|
| 10798 | 9/1880 | Fed. Rep. of Germany. | |
| 30252 | 7/1884 | Fed. Rep. of Germany. | |
| 400018 | 9/1965 | Switzerland. | |
| 271489 | 9/1927 | United Kingdom | 160/315 |

OTHER PUBLICATIONS

"Soviet Inventions Illustrated" Week B35, Oct. 10, 1979 Section Q63 & Su-A-634-032.

*Primary Examiner*—Peter M. Caun
*Attorney, Agent, or Firm*—Young & Thompson

[57] ABSTRACT

The invention relates to a slip coupling for preventing the overwinding of the motor spring of a roller blind. In one embodiment the slip coupling is incorporated as part of a bracket for supporting one end of the roller. The bracket has a cylindrical bearing which is rotatable within a circular aperture in the face of the bracket and receives a pin of the spindle of the roller so as to be rotatable therewith. The bearing carries a spring the ends of which engage with stops on the face of the bracket so that the bearing is prevented from rotation when the torque exerted by the motor spring is below a predetermined level. When the motor spring is overwound the ends of the springs are caused to flex to override the stops and so reduce the tension in the motor spring. In a second embodiment the slip coupling is located within the roller.

10 Claims, 11 Drawing Figures

DEVICE FOR PREVENTING OVERWINDING OF A ROLLER BLIND

The invention relates to improvements in roller blinds.

Conventional roller blinds comprise an elongate cylindrical roller around which a window shade is rolled. The roller has an interior housing at one end thereof within which is mounted a spindle disposed co-axially with the roller. The spindle terminates in a flat pin which extends beyond the end of the roller and is held against rotation by engaging in a slot in the support bracket for the roller blind. The roller is rotatable relative to the spindle. A torsion spring is disposed around the spindle and is connected at one end thereof to the spindle and by its other end to the interior of the roller. Thus rotation of the roller in one direction relative to the spring acts to wind up the spring which is maintained in a wound up state by means of a pawl on the roller which engages with a ratchet connected to the spindle. When in use the roller blind is mounted in brackets on the window frame, and when the shade is extended by unwinding it from the roller this causes the roller to rotate relative to the spindle to impart a torque in the spring. The pawl and ratchet arrangement operates to hold the shade against the torque of the spring in a desired unwound extended position of the shade. To rewind the shade it is pulled downwards for a short distance to release the pawl from the ratchet and when the shade is released, the spring will unwind to rotate the roller in a shade winding direction. The spring tension must be sufficient to rotate the roller fast enough for the pawls to remain disengaged by centrifugal force while the shade is being wound up.

Therefore the mechanism will not function satisfactorily unless the torsion spring is pretensioned. This usually is done by manually rolling the shade on to the roller, placing the roller in the brackets and then pulling down the shade to impart an initial torque in the spring. Without releasing the pawl the roller is taken out of the brackets and rolled up again by hand, replaced on the brackets and pulled down again to impart a further torque in the spring. Thus, when the pawl is then released and the roller rewinds the shade, the initial torque will be retained in the spring.

It is a common occurrence that roller blinds are damaged, or will not function properly because the user does not pre-set the torsion spring to the correct tension. If the spring is not wound to the correct tension the roller blind will not operate effectively and if overwound the spring may be strained or broken. Overwinding can occur for example in use if the roller is removed from its support brackets either intentionally (e.g. for cleaning) or if it is allowed to unwind so abruptly that the roller is knocked out of its brackets, and is then re-wound by hand.

It is an object of the invention to overcome the aforesaid problems and to provide a device for association with a roller blind which device will prevent the torsion spring from becoming damaged by overwinding and which, if the spring is overtensioned, will automatically permit the spring to adjust itself to the correct tension.

According to the invention a roller blind has associated therewith a slip coupling which normally acts to resist unwinding of the torsion spring when the tension in the torsion spring is at or below a predetermined tension but which when the tension spring is overstressed is adapted to slip to permit unwinding of the torsion spring until the tension in the torsion spring is again at or below said predetermined tension. The slip mechanism can be disposed on or within the roller or may be incorporated in a support bracket for the roller.

In accordance with one aspect of the invention a roller blind assembly includes a bracket for supporting one end of the roller, and the bracket has incorporated therein a cylindrical bearing which is mounted for rotation within a circular aperture in a face of the bracket and which includes means for engagement with an end of the spindle whereby the bearing and spindle are prevented from rotating relative to each other, and wherein means are provided to resist rotation of the bearing within the bracket, the arrangement being such that when the torsion spring is wound above a predetermined tension the force in the spring is sufficient to cause the bearing to overcome the resistance means, to allow the bearing to rotate within the bracket thereby permitting rotation of the spindle relative to the roller to reduce the tension in the torsion spring below a predetermined limit. The engagement means preferably comprises an elongate aperture in the face of the bearing which is adapted to receive a flat pin on the end of the spindle. The resistance means preferably comprises a resilient spring member rotatable with the bearing but normally prevented from rotating by a stop or stops on the bracket but which, when the force exerted by the tension springs exceeds a predetermined limit, is caused to flex to override the stop or stops and permit rotation of the bearing in the bracket.

In a preferred embodiment the spring is comprised of a length of wire of suitable resilience retained in a substantially diametrically disposed channel in a face of the bearing, opposite ends of the wire extending from the channel to engage with stops formed in the face of the bracket. Preferably, the ends of the wire extend substantially at a tangent from the edge of the bearing, and means are provided on the bearing to dampen oscillation in the ends of the wire.

In another embodiment the resistance means is a flat spiral spring.

The incorporation of the slip coupling in the support bracket has the advantage that the slip coupling may be used with conventional roller blinds and existing production methods for the rollers need not be altered. Nevertheless, there are certain advantages in having the slip coupling disposed within the roller. Thus, in accordance with a further embodiment the invention provides a roller blind comprising an axially elongate cylindrical roller, a spindle axially disposed within a housing at one end of the roller and terminating in a flat pin which extends beyond the end of the roller, a torsion spring disposed around the spindle with one end of the torsion spring attached to the spindle, and wherein the other end of the torsion spring is connected to a collar rotatable about the spindle, and wherein means are provided to resist rotation of the collar on the spindle when the torque exerted by the torsion spring is at or below a predetermined level but said means being operable to permit rotation of the collar when the tension in the torsion spring exceeds said predetermined level thereby permitting unwinding of the torsion spring until the tension in the torsion spring is again at or below said predetermined level. The resistance means may comprise a resilient spring attached to the collar and rotatable therewith but which is normally prevented from rotating by means of a stop or stops on the interior of the roller housing but which, when the force exerted by the torsion spring exceeds a predetermined limit, is caused to flex to override the stop or stops and permit unwinding of the torsion spring.

Some embodiments of the invention are hereinafter described with reference to the accompanying drawings, wherein.

Figure 1:
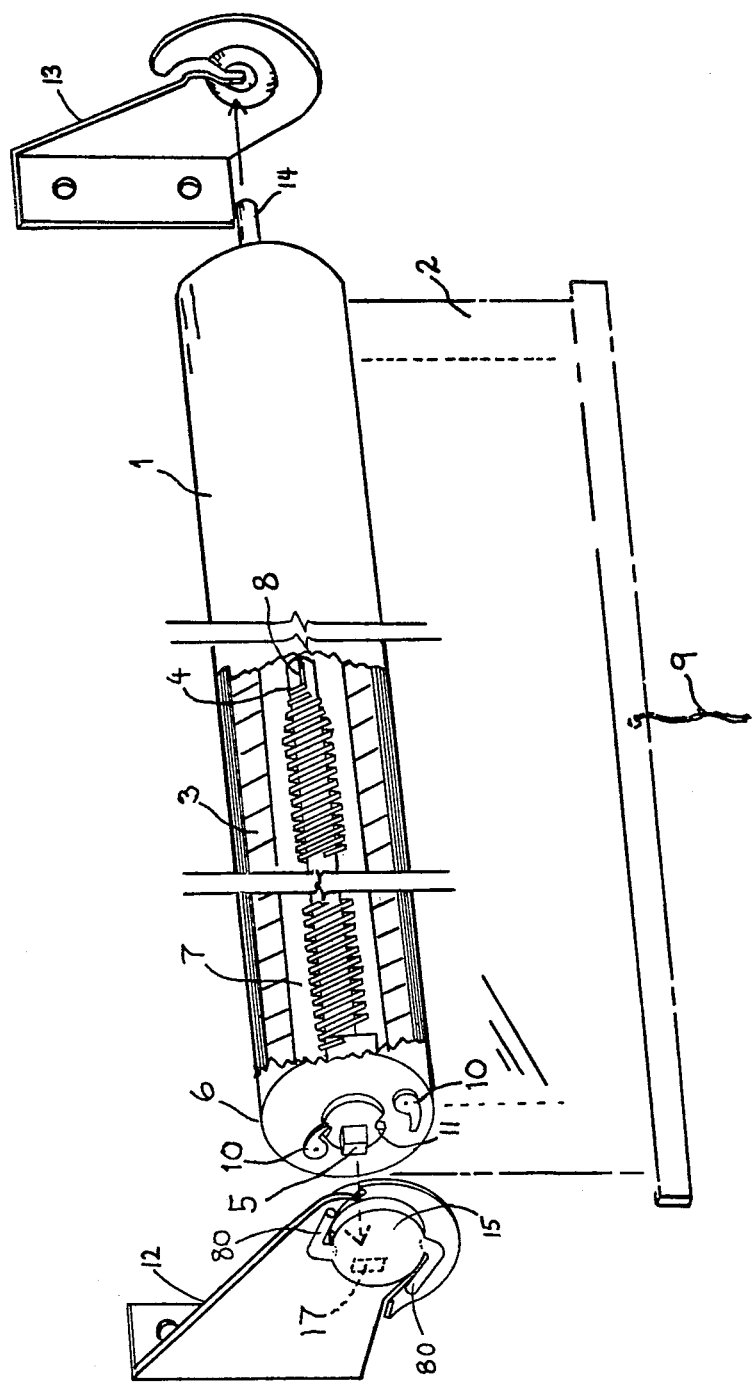
FIG. 1 is a perspective view, partly in section, showing one embodiment of a roller blind assembly according to the invention.

Referring to FIG. 1 of the drawings, a roller shade assembly comprises a conventional roller 1 which may be constructed from wood, metal, paper or plastics. A sheet of window shade material 2 is attached by its upper edge to the roller, in well-known manner, and is adapted to be wound around the roller. A hollow cylindrical housing 3 is formed at one end of the roller which houses the motor for rotating the roller to wind up the shade. The motor mechanism comprises a spindle 4, which is usually made from wood and which is disposed co-axially with the roller. One end of the spindle terminates in a flat pin 5 which extends from one end of the roller. The spindle 4 and pin 5 are mounted in a bearing which may be formed in a ferrule 6 or the like forming the end of the roller. The arrangement is such that the roller can rotate relative to the spindle 4 and pin 5. A torsion spring 7 which is in the form of a helical spring is coiled about the spindle 4. One end of the spring 7 is fixed in a slot 8 formed in the end of the spindle. The opposite end of the spring 7 is attached to the interior wall of the roller. Thus rotation of the roller 1 in one direction relative to the spindle 4 acts to wind up the spring.

In a conventional blind assembly the pin 5 is held against rotation in a slot formed in a bracket for supporting the roller. Thus when the shade 2 is lowered by pulling on a pull cord 9, the roller rotates relative to the spindle to wind up the spring. The shade is maintained against the torque of the spring in a desired unwound extended position by means of pawls 10 pivotally mounted on the end face of the roller and which engage with a ratchet 11 connected to and rotatable with the pin 5. The pawls engage by gravity when the speed of rotation of the roller is slow, but are kept in a disengaged position by centrifugal force if the roller is allowed to rotate quickly. Thus, to rewind the shade the pull cord 9 is pulled downwards for a short distance to release the pawls 10 from the ratchet whereupon the spring 7 will unwind to rotate the roller in the shade winding direction.

In the assembly of the invention the roller is supported in brackets 12 and 13 which are screwed or otherwise secured to the window frame. Bracket 13 serves to receive a round pin 14 which protrudes from the roller at the end opposite to the end which contains the spring mechanism. Bracket 13 is described in more detail hereinafter.

Figure 3:
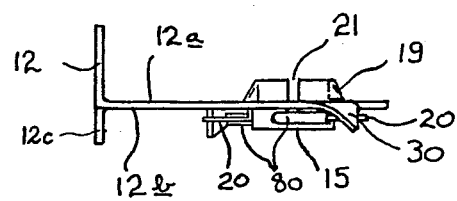
FIG. 3 is a plan view of the device of FIG. 2.
Figure 4:
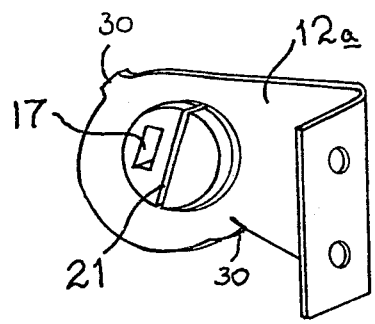
FIG. 4 is a front perspective view of the device of FIG. 2.
Figure 5:
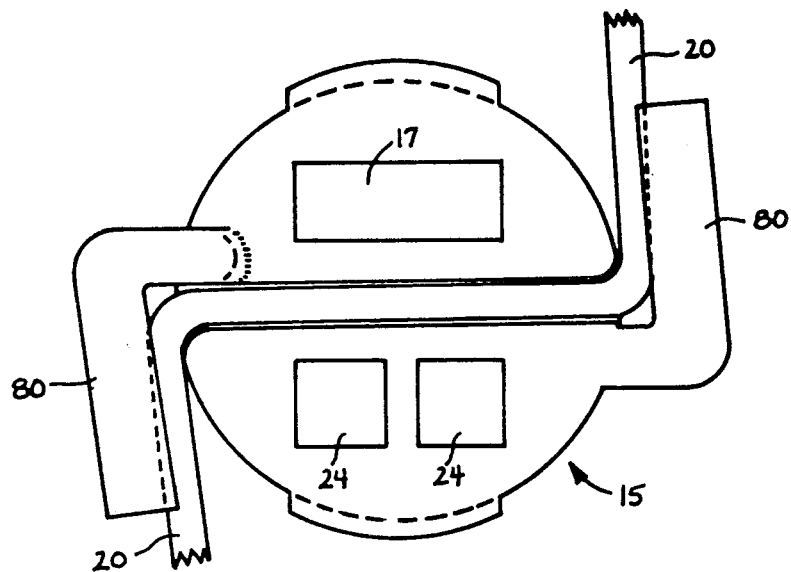
FIG. 5 is a front elevation to an enlarged scale of a bearing member for use in the invention.
Figure 6:
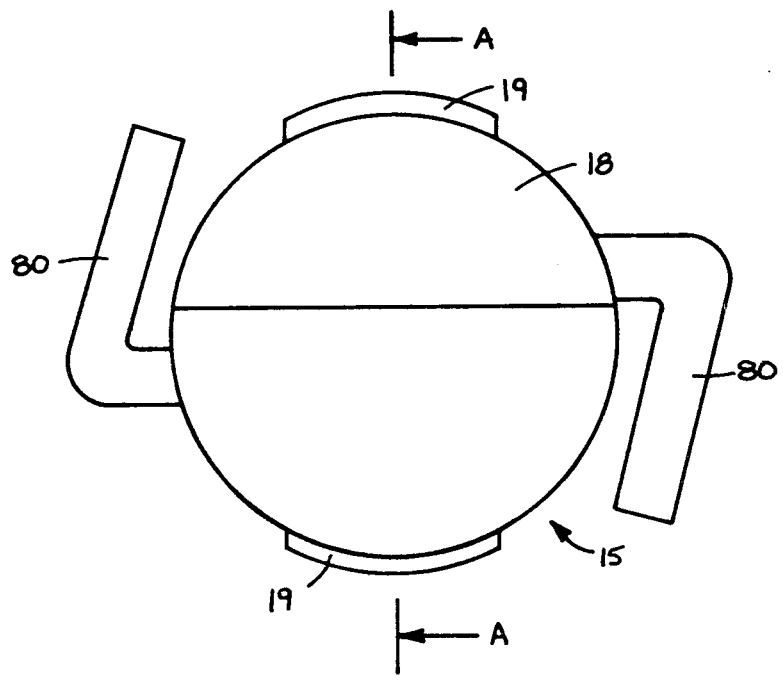
FIG. 6 is a rear elevation of the bearing member of FIG. 5.
Figure 7:
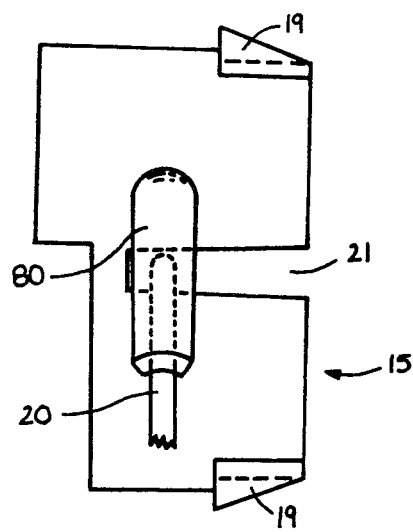
FIG. 7 is a side elevation of the bearing member of FIG. 5.
Figure 8:
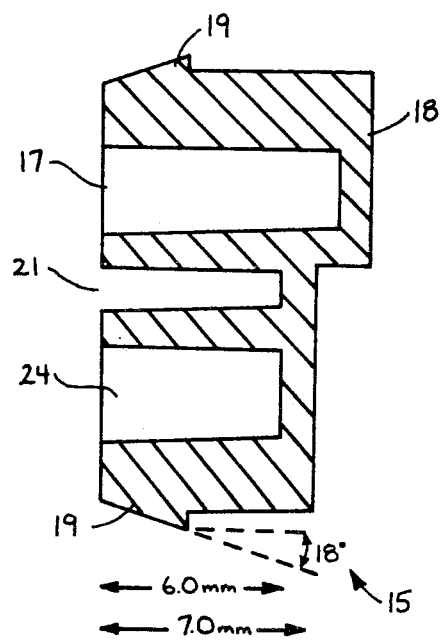
FIG. 8 is a sectional plan view on the lines A—A of the bearing member of FIG. 6.

Bracket 12 is adapted to receive the flat pin of the spindle and incorporates the slip coupling of the invention. Bracket 12 is shown in more detail in FIGS. 2 and 4 and is comprised of a cylindrical bearing 15 which is rotatably mounted in a circular aperture 16 cut in the face of the bracket. The bearing may be injection-moulded from a plastics material. The bearing is of generally circular shape and is comprised of a cylindrical body portion 18 which is almost the same diameter as the circular aperture 16 in the face of the bracket so that the cylindrical portion snap-fits into the aperture. The bearing member is retained in the aperture by a shoulder portion 19 which is of greater diameter than the aperture, and also by a resilient spring 20 (see FIGS. 2, 3 and 5). The spring 20 is retained in a slot 21 formed diametrically of the bearing. It will be noted from FIG. 3, in particular, that when the bearing member is fitted in place in the aperture in the bracket with the shoulder 19 abutting against the face 12a of the bracket, the cylindrical portion 18 protrudes through to the opposite face 12b of the bracket and the wire spring is located in that part of the slot 21 which is positioned on the side 12b of the bracket, so that the spring and shoulder 19 act together to retain the bearing member in the aperture 16. The bearing member 15 is designed with a view to keeping its thickness in the axial direction to a minimum, particularly where it protrudes through on the face 12b of the bracket. This is to ensure that the blind can be mounted quite close to the edge of the window opening. A foot 12c of the bracket ensures that the face 12b is adequately spaced from the window surround. The shoulder portion 19 of the bearing is formed in its face with a receptacle aperture 17 which is adapted to receive the flat pin 5 of the spindle. The aperture 17 is of substantially the same dimensions as the flat pin 5 so that the bearing member will rotate with the pin 5 and not relative thereto. The bearing member may also include apertures 24 and cut-away 25 which facilitate the fast curing of the bearing in the moulding process but do not have any structural significance as far as the invention is concerned.

As indicated above, a wire spring 20 is located in the slot 21. Suitably the wire is a resilient steel wire of the kind used in musical instruments (e.g. piano wire) and may be from 0.8 to 1 millimeter in diameter. The wire extends diametrically of the bearing member 15 and the ends of the wire where they leave the bearing member are turned so that they extend substantially at a tangent to the edge of the cylindrical portion 18 of the bearing member.

The ends of the wire 20 abut against stops 30 formed on the face 12b of the bracket. Thus the bearing member 15 (and of course the spindle 4 which is in non-rotatable relation with the bearing 15 through pin 5) is normally prevented from rotating in the bracket 12. However, the thickness and resilience of the wire 20 is so chosen that when the torque exerted by the torsion spring 7 of the roller exceeds a predetermined limit the ends of the spring 20 will be deflected so that they override the stops 30 to permit rotation of the bearing in the bracket 12. It will be appreciated that rotation of the bracket 15 also permits rotation of the spindle 4 so as to unwind the torsion spring. When the tension in the torsion spring is thus reduced below a predetermined limit, the ends of the wire 20 will again prevent rotation of the bearing member 15 in the bracket 12. In this way the overstraining of the torsion spring is prevented and the device of the invention serves to reduce the tension in the spring to a safe level without allowing it to drop below the working tension required to operate the roller. In Table I below is set out, as an example, the thickness and length of wire suitable for use with roller blinds of various dimensions, where the stops are 30 mm apart:

TABLE I

| Diameter of Roller | Weight of blind material per ft. wide | Width of blind material | Length of material in drop | Length of wire (piano wire) before bending | Thickness of wire |
| --- | --- | --- | --- | --- | --- |
| 1 inch | 235 gms | 3 | 6 ft | 50 mm | 0.838 mm |
| 1 inch | 235 gms | 4 | 6 ft | 50 mm | 0.888 mm |
| 1 inch | 235 gms | 6 | 6 ft | 50 mm | 0.960 mm |

It has been found that the effective length of the wire 20 is that between the tangential point where it leaves the slot 21 and where it contacts the lug 30. The effective length of the wire must be sufficiently long to permit the wire to flex under the desired loads of the torsion spring. Thus the position of the stops 30 is also of importance. The stops 30 are in the form of lugs bent from the edge of the bracket which is of circular configuration. The diameter of the bracket in this region must also be sufficient to allow the wire to flex and a diameter of 30 millimeters has been found to be suitable.

Figure 2:
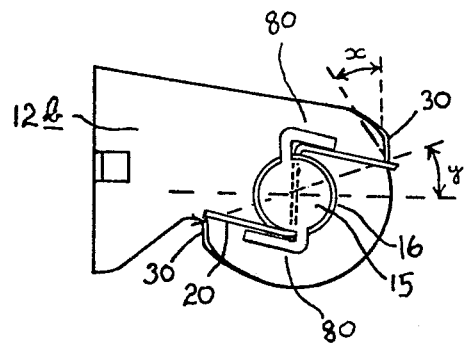
FIG. 2 is a rear elevation of a support bracket incorporating a slip device of the invention.

Referring to FIG. 2 of the drawings, this shows the relative positions of the two lugs in relation to the horizontal axis of the bracket. Thus the angle Y which is the angle between the horizontal axis and the line on which the lugs are positioned would be about 10°. It will be noted that as the ends of the wire 20 override the lugs 30, friction is created between the ends of the wire and the inner faces of the lugs. In order to minimise this friction, the lugs 30 are not disposed exactly along a tangent to the circular edge of the bracket but are disposed at an angle x to the tangent, which angle x is preferably in the range 20° to 30°, suitably 22½°. The lugs are made ramp-shaped by having their rear sides sloped so that the spring member will ride up over the lugs should the bearing be wound in reverse. This permits manual winding-up of the shade without having to remove the roller 1 from the brackets.

It has been found that as the free ends of the wire 20 override the stops 30 flexing of the spring will occur which sets up oscillations in the spring. If the slip device of the invention is used very frequently these oscillations will tend to weaken the wire 20 which will eventually break. While this is not a great problem in practice where the device is used with a window blind because it is unlikely that the torsion spring of the blind roller will be overwound on more than one or two occasions, it is desirable nonetheless that the device should be as robust as possible. To this end dampening means which are in the form of abutment members 80 are located behind the free ends of the wire 20. The abutment members 80 are in the form of angled arms which extend substantially tangentially from the periphery of the cylindrical bearing 15 at diametrically opposed locations on the bearing. The members 80 are preferably moulded as an integral part of the bearing 15 and so are of the same material as the bearing, e.g. nylon. The abutment members 80 abut the free ends of the wire 20 and so limit flexing of the ends of the wire when they override the stops 30, and dampen oscillations in the wire.

Figure 9:
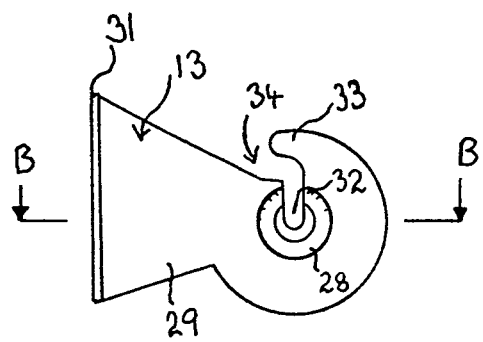
FIG. 9 is a front elevation of an end support bracket for use in conjunction with the bracket of FIG. 2.
Figure 10:
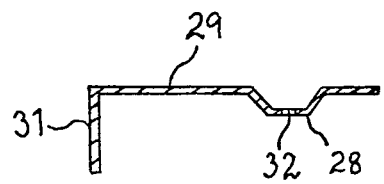
FIG. 10 is a sectional plan on the lines B—B of FIG. 9.

The bracket 13 which, as shown in FIG. 1 supports a round pin 14 at the other end of the roller, is itself novel and inventive and forms another aspect of the invention. With conventional roller blind assemblies, the bracket which receives the round pin of the roller usually contains a cylindrical recess which receives the pin. The round pin and the bracket to receive it are usually positioned at the right hand side of the roller and when mounting the roller in the brackets, it is usual to stand at the left hand side and from that position insert the round pin in the cylindrical recess which, in the case of a relatively long roller, is difficult to achieve. The bracket of the invention is shown in more detail in FIGS. 9 and 10 and comprises a body portion 29 formed with a flange 31 by means of which the bracket may be attached to the window frame. The body portion 29 is formed with an outwardly pressed circular portion 28 which contains the end of a slot 32 into which the pin 14 of the roller may be dropped. The top portion of the slot is partly closed by a curved hook portion 33 which defines the entry 34 to the slotted portion 32. The entry portion 34 faces towards the flange 31. In the case of a conventional roller blind, if the extended blind is accidentally allowed to rewind abruptly, the bottom slat of the blind will revolve around the roller to unwind the torsion spring and this may cause the roller to unwind and/or fall out of the brackets. The bracket 13 prevents this occurring because the hook portion 33 serves to prevent the pin 14 from lifting vertically out of the bracket and directs the pin rearwardly towards the flange 31. Thus if the roller rises in the brackets it will be deflected so as to strike the window frame which stops the roller rotating.

Figure 11:
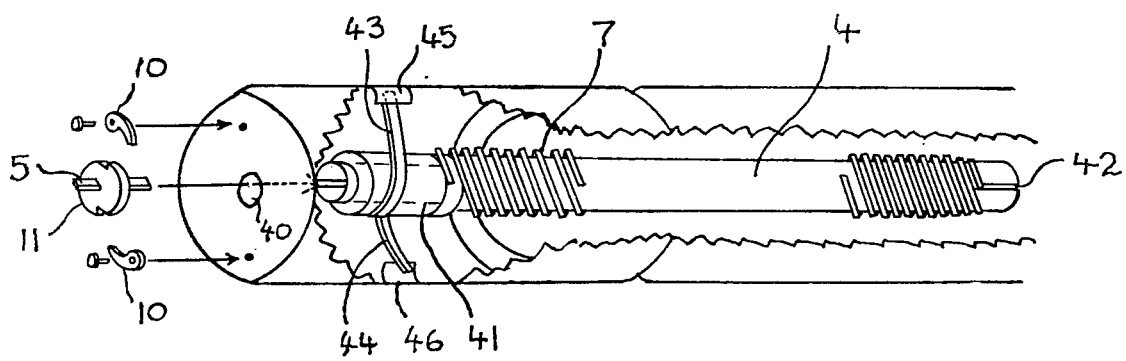
FIG. 11 is a perspective view, partly broken away, of a roller incorporating a slip coupling according to a second embodiment of the invention.

A second embodiment of the slip coupling according to the invention is shown in FIG. 11. In this embodiment the slip coupling is disposed within the roller 1. As is the case with a conventional roller blind the spindle 4 is rotatable in a bearing 40 formed in the end of the roller so that the roller can rotate relative to the spindle. A flat pin 5 is attached to the end of the spindle and is rotatable therewith. The pin 5 carries a ratchet 11 which is adapted to engage with pawls 10 pivotally mounted on the end of the roller. An annular collar 41 is rotatably mounted, within the housing, on the end of the spindle 4 and has one end attached to the collar 41. The opposite end of the torsion spring is received in a slot 42 at the other end of the spindle. A pair of wire springs 43, 44 are connected to the collar 41 and extend tangentially therefrom at diametrically opposite locations. The wire springs 43 and 44 may be comprised of piano wire of the kind used to form the wire spring 20 of the embodiment shown in FIGS. 1 to 8. The free ends of the wire springs 43, 44 abut against stops 45, 46, respectively which are formed on the inner wall of the roller 1. In operation, when the roller 1 is rotated in the support brackets by pulling down the shade material, the torque is transmitted via the shaft 4 and thus winds up the torsion springs 7. However, should the tension in the torsion spring exceed the working tension required to rewind the blind, the wire springs 43, 44 will be deflected to by-pass the stops 45, 46 respectively, thus allowing the sleeve 41 to rotate relative to the roller to unwind the spring until the tension has again been reduced to the working tension required.

Although the slip coupling of the invention has been described with reference to a roller blind, it can also be used to prevent overwinding of other spring-powered devices such as alarm clocks and clockwork toys.

I claim:

1. In or for a roller blind having an axially elongate cylindrical roller, a spindle axially disposed within a housing at one end of the roller and terminating in a flat pin which extends beyond the end of the roller, a torsion spring disposed around the spindle and means for tensioning the torsion spring such that on unwinding it may rotate the roller in a shade winding direction, the improvement comprising the provision of a slip coupling which normally acts to resist unwinding of the torsion spring when the tension in the torsion spring is at or below a predetermined tension but which when the torsion spring is overstressed is adapted to slip to permit unwinding of the torsion spring until the tension in the torsion spring is again at or below said predetermined tension.

2. In or for a roller blind assembly the provision of a slip coupling according to claim 1, wherein the slip coupling is incorporated in a bracket for supporting said flat pin of the roller.

3. A roller blind bracket for use in the assembly of claim 2, the bracket including a cylindrical bearing which is mounted for rotation within a circular aperture in the face of the bracket and which includes means for engagement with said flat pin of the spindle whereby the bearing and spindle are prevented from rotating relative to each other, and wherein means are provided to resist rotation of the bearing within the bracket when the torque exerted by the pin is below a predetermined level but said means being operable to permit rotation of the bearing when the torque exceeds a predetermined level whereby any excess tension in the torsion spring of the roller is reduced.

4. A roller blind bracket as claimed in claim 3, wherein the resistance means comprises a resilient spring member rotatable with the bearing but normally prevented from rotating by means of a stop or stops on the bracket but which when the torque exerted by the flat pin exceeds a predetermined limit is adapted to flex to override the stop or stops and permit rotation of the bearing.

5. A roller blind bracket as claimed in claim 4, wherein the spring member comprises a length of wire of suitable resilience held in the bearing with opposite ends of the wire extending from the bearing to engage with stops on the face of the bracket.

6. A roller blind bracket as claimed in claim 5, wherein means are provided on the bearing to dampen oscillations in the ends of the wire.

7. A roller blind bracket as claimed in claim 6, wherein the dampening means comprises an abutment or abutments on the bearing which restrict movement of the free ends of the wire in one direction.

8. A roller blind bracket as claimed in claim 4, wherein the stop or stops are ramp-shaped such that the resilient spring member will override the stop or stops if rotated in a reverse direction.

9. A roller blind comprising an axially elongate cylindrical roller, a spindle axially disposed within a housing at one end of the roller and terminating in a flat pin which extends beyond the end of the roller, a torsion spring disposed around the spindle with one end of the torsion spring attached to the spindle, and wherein the other end of the torsion spring is connected to a collar rotatable about the spindle, and wherein means are provided to resist rotation of the collar on the spindle when the torque exerted by the torsion spring is at or below a predetermined level but said means being operable to permit rotation of the collar when the tension in the torsion spring exceeds said predetermined level thereby permitting unwinding of the torsion spring until the tension in the torsion spring is again at or below said predetermined level.

10. A roller blind as claimed in claim 9, wherein the resistance means comprises a resilient spring attached to the collar and rotatable therewith but which is normally prevented from rotating by means of a stop or stops on the interior of the roller housing but said resilient spring being adapted to flex to override the stop or stops when the tension in the torsion spring exceeds a predetermined level.

* * * * *